(12) United States Patent
Semmes

(10) Patent No.: US 6,752,740 B2
(45) Date of Patent: Jun. 22, 2004

(54) CONTINUOUSLY VARIABLE TRANSMISSION

(76) Inventor: Jeffery T. Semmes, 1257 S. Ward Pkwy., Haysville, KS (US) 67060

( * ) Notice: Subject to any disclaimer, the term of this patent is extended or adjusted under 35 U.S.C. 154(b) by 56 days.

(21) Appl. No.: 10/292,259

(22) Filed: Nov. 12, 2002

(65) Prior Publication Data

US 2004/0092360 A1 May 13, 2004

(51) Int. Cl.[7] .............................................. F16H 55/32
(52) U.S. Cl. .............................. 476/72; 476/6; 476/51
(58) Field of Search ................................ 476/6, 22, 51, 476/65, 66, 68, 72

(56) References Cited

U.S. PATENT DOCUMENTS

| | | | | |
|---|---|---|---|---|
| 31,978 A | * | 4/1861 | Howlett .......................... | 476/6 |
| 244,126 A | * | 7/1881 | Herschel ....................... | 476/72 |
| 457,206 A | * | 8/1891 | Meier ........................... | 476/72 |
| 875,962 A | * | 1/1908 | Stanley .......................... | 476/31 |
| 886,911 A | * | 5/1908 | Wolter .......................... | 476/16 |
| 887,961 A | * | 5/1908 | Pfeiffer ......................... | 476/20 |
| 1,050,351 A | * | 1/1913 | Dean ............................ | 476/31 |
| 1,081,799 A | * | 12/1913 | Whipple ...................... | 74/721 |
| 1,187,440 A | * | 6/1916 | Manuel ........................ | 476/50 |
| 2,424,873 A | * | 7/1947 | Abbrecht ...................... | 476/72 |
| 2,660,897 A | * | 12/1953 | Neidhart et al. ............... | 476/48 |
| 3,066,544 A | * | 12/1962 | Gerard ......................... | 476/48 |
| 4,183,253 A | * | 1/1980 | Borello ........................ | 476/16 |

* cited by examiner

Primary Examiner—David A. Bucoi
Assistant Examiner—Timothy McAnulty
(74) Attorney, Agent, or Firm—Kenneth H. Jack; Davis & Jack, LLC

(57) ABSTRACT

A continuously variable transmission including a rotatable scroll having an axis of rotation and having upper and lower faces, the upper and lower faces each being conical and each having a pitch, the rotatable scroll being alternately upwardly and downwardly skewable along its axis of rotation, the pitches of the upper and lower faces respectively decreasing and increasing upon upward skewing of the rotatable scroll, the pitches of the upper and lower faces respectively increasing and decreasing upon downward skewing of the rotatable scroll; including upper and lower rotatable wheels, each having an axis of rotation and each having a forward face, each forward face being conical; and including a support frame pivotally and rotatably mounting the upper and lower rotatable wheels with respect to the rotatable scroll, the support frame enabling pivotable motion of the upper and lower rotatable wheels to alternately upwardly and downwardly skew the rotatable scroll, the support frame further enabling the upper and lower rotatable wheels to rotate and counter rotate against the rotatable scroll's upper and lower conical faces.

19 Claims, 6 Drawing Sheets

CONTINUOUSLY VARIABLE TRANSMISSION

FIELD OF THE INVENTION

This invention relates to apparatus for continuously variable rotary power transmission. More particularly, this invention relates to such apparatus which incorporate variously sized and shaped counter rotating friction wheels.

BACKGROUND OF THE INVENTION

A known continuously variable power transmission comprises a conical wheel which is frictionally paired with a second wheel, the axes of rotation of the conical and second wheels typically being aligned so that they lie within a single flat reference plane. In such configuration, while the points of frictional contact between the conical and second wheels are near the conical wheel's base, rotation of the conical wheel counter rotates the second wheel at a high speed. Conversely, frictional contact near the conical's wheel's point results in counter rotation of the second wheel at a relatively low speed. Such an assembly provides continuously variable rotary power transmission as a result of a potentially infinite number of positions of the second wheel between the conical wheel's point and base.

In order for the above exemplary conical wheel transmission to effectively transmit rotary power, an acceptable level of friction must exist at the points of contact between the two wheels. A known means for enhancing wheel driving friction at such contact point forms one or both of the wheels from a material having a high coefficient friction, such as rubber. However, high friction materials, such as rubber, are often undesirably utilized because they lack durability. Another known means of enhancing wheel driving friction at the contact point is to widen the contact face of the second wheel, resulting in a lengthening of its zone of frictional contact with the conical wheel. However, in such configuration, opposing sliding friction force vectors invariably arise on opposite sides of a centrally located useful static friction zone. The resultant sliding friction undesirably causes heat build up, and undesirably reduces the mechanical efficiency of the rotary power transmission.

The instant inventive continuously variable transmission overcomes or ameliorates the problems discussed above by providing a dual conical friction wheel assembly which is capable of continuously variable power transmission through mechanical deformation of one of the friction wheels of the assembly, such friction wheel comprising an axially skewable scroll.

BRIEF SUMMARY OF THE INVENTION (Descriptions below use the spacial orienting terms "forward", "rearward", "upper", and "lower" solely for convenience of reference. The scope of the invention includes all spacial orientations.)

A primary structural component of the instant inventive continuously variable transmission comprises a rotatable scroll, preferably comprising an axially extending bar axle having a spindle mounted thereover in the manner of a quill assembly, the spindle being capable of rotating about the bar axle, the spindle preferably being further capable of sliding linearly along the bar axle.

A regular trapezoidally shaped ribbon or strap of sheet steel is preferably wrapped a multiplicity of times around the annular outer surface of the spindle, causing the angled edges of the trapezoidal sheet to form upper and lower conical friction wheel faces.

While the rotatable scroll is symmetrically configured, the pitches of its conical upper and lower faces are equal. Upon an upward skewing of the spiral wrappings of the rotatable scroll to enhance or increase the pitch of its conical lower face, the conical face of its upper face is correspondingly decreased. Conversely, downward skewing of the rotatable scroll increases the conical pitch of its upper face and correspondingly decreases the conical pitch of its lower face. Suitably, the skewable spirally wrapped component of the rotatable scroll may alternately comprise a multiplicity of nesting tubes having progressively narrower axial lengths, such nesting tubes being skewable as described above.

Second and third primary structures of the instant invention comprise upper and lower solid or non-skewable conical friction wheels. The conical friction wheels are necessarily held in frictional contact with the upper and lower conical faces of the rotatable scroll. The conical friction wheels are preferably mounted pivotally with respect to the rotatable scroll so that pivoting and counter pivoting motions of the conical friction wheels alternately skew the skewable (preferably spirally wrapped) component of the rotatable scroll upwardly and downwardly, altering the pitches of the scroll's faces as described above. Upon clockwise pivoting of the upper and lower conical friction wheels with respect to the rotatable scroll, the faces of the scroll are skewed upwardly causing, upon counter rotation of the friction wheels against the scroll, the upper conical friction wheel to rotate faster than the lower conical friction wheel. Conversely, counter clockwise pivoting of the upper and lower conical friction wheels downwardly skews the faces of the scroll, causing the upper conical friction wheel to rotate more slowly than the lower conical friction wheel.

Mounting means in the nature of a support frame is preferably provided, the support frame enabling the upper and lower conical friction wheels to pivot in relation to the rotatable scroll for alternately upwardly and downwardly skewing the faces of the rotatable scroll, the support frame preferably further enabling the upper and lower conical friction wheels to counter rotate against the upper and lower conical faces of the scroll for continuously variable transmission of rotary power through the scroll.

Accordingly, an object of the instant invention is the transmission of rotary power through a skewable or deformable scroll for continuously variable power transmission.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
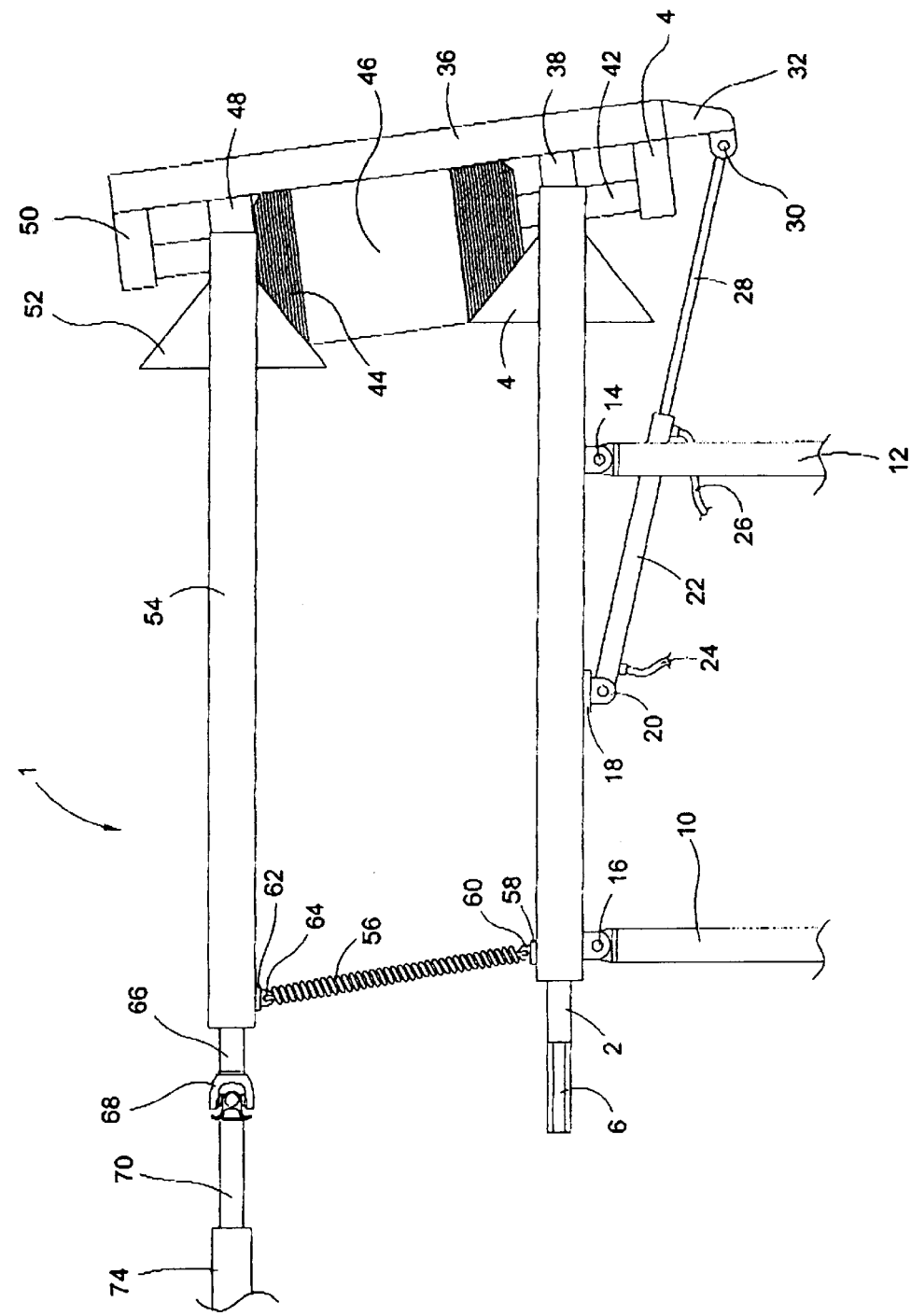
FIG. 1 is a side view of the instant inventive continuously variable transmission.
Figure 5:
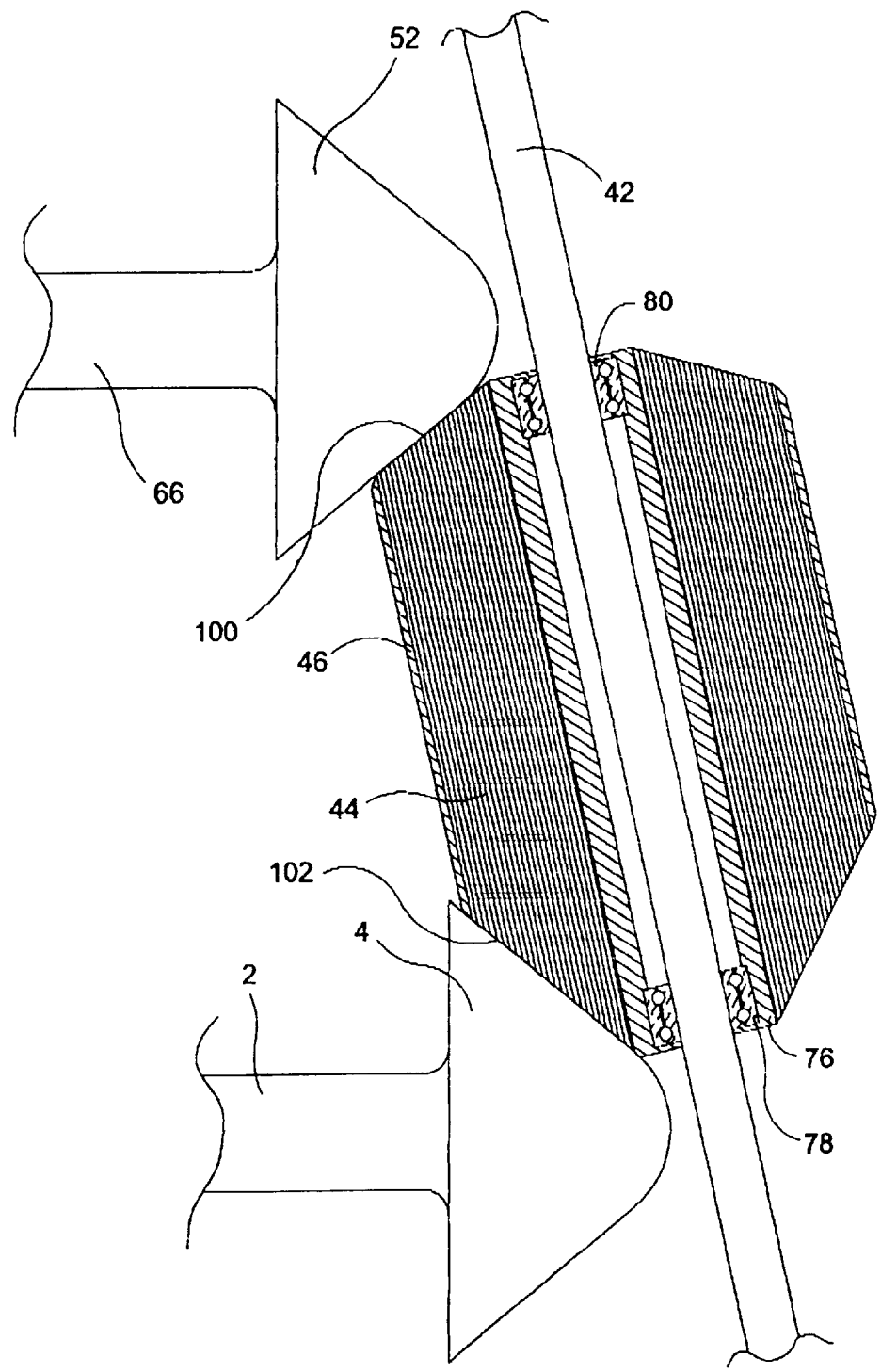
FIG. 5 is a sectional view as indicated in FIG. 4, the view being representative of the configuration of FIG. 1.

Referring now to the drawings, and in particular to FIG. 1, the instant inventive continuously variable transmission is referred to generally by Reference Arrow 1. Referring simultaneously to FIGS. 1 and 5, the rotatable scroll component of the instant invention preferably comprises a bar axle 42, ball bearings 78 and 80, a spindle 76, a trapezoidally shaped and spirally wound strap of sheet steel 44, and a retainer sleeve 46. Bearings 78 and 80 preferably allow the spindle 76, the spirally wound sheet 44, and the sleeve 46 to simultaneously rotate about. axle 42, and allow said structures to slide along axle 42.

Figure 3:
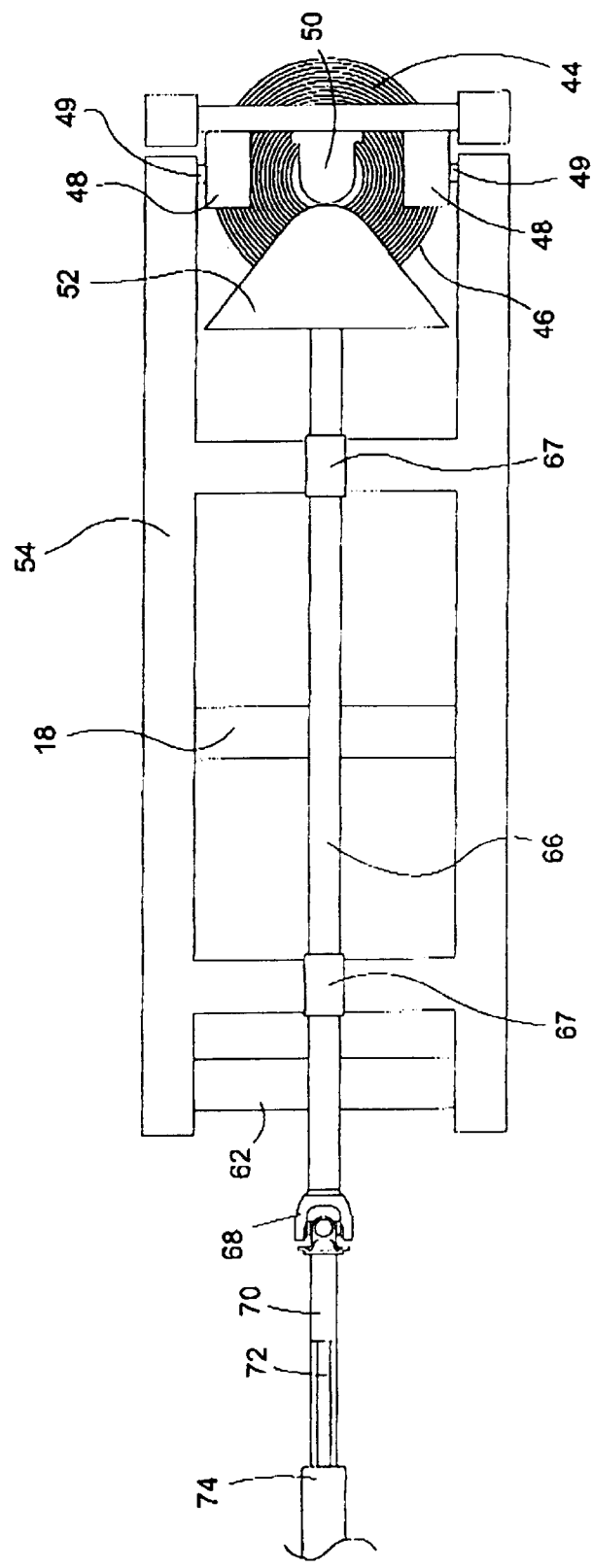
FIG. 3 is a top view of the apparatus of FIGS. 1 and 2.

Referring simultaneously to FIGS. 3 and 5, upper and lower conical friction wheels 52 and 4 are positioned in frictional contact with the upper and lower conical faces of the rotatable scroll, such faces preferably comprising the lateral edges of the spirally wound sheet 44. The conical friction wheels 52 and 54 preferably have rearwardly extending power output and input axles 66 and 2, the axes of rotation of axles 62 and 2, of friction wheels 52 and 4, and of axle 42 all preferably lying within a single flat reference plane. The points of the conical friction wheels 52 and 4 are preferably rounded, preventing such wheels from contacting axle 42. Conical friction wheels 52 and 4 are preferably positioned in relation to axle 42 so that the geometrically extended points of such cones would coincide with points upon the longitudinal axis of axle 42.

Referring further simultaneously to FIGS. 3 and 5, an upper ladder frame 54 having rotary bearings 67 rotatably supports the upper conical friction wheel 52 and its axle 66, the bearings 67 preferably resisting any axially directed movement of axle 66 and conical wheel 52 with respect to upper ladder frame 54. Referring simultaneously to FIGS. 1, 3, and 5, a lower ladder frame 8 is configured substantially identically with upper ladder frame 54, ladder frame 8 similarly rotatably supporting axle 2 and conical friction wheel 4. Ladder frames 54 and 8 are representative of numerous other structural frame support configurations which are capable of rotatably supporting conical friction wheels 52 and 4.

Figure 4:
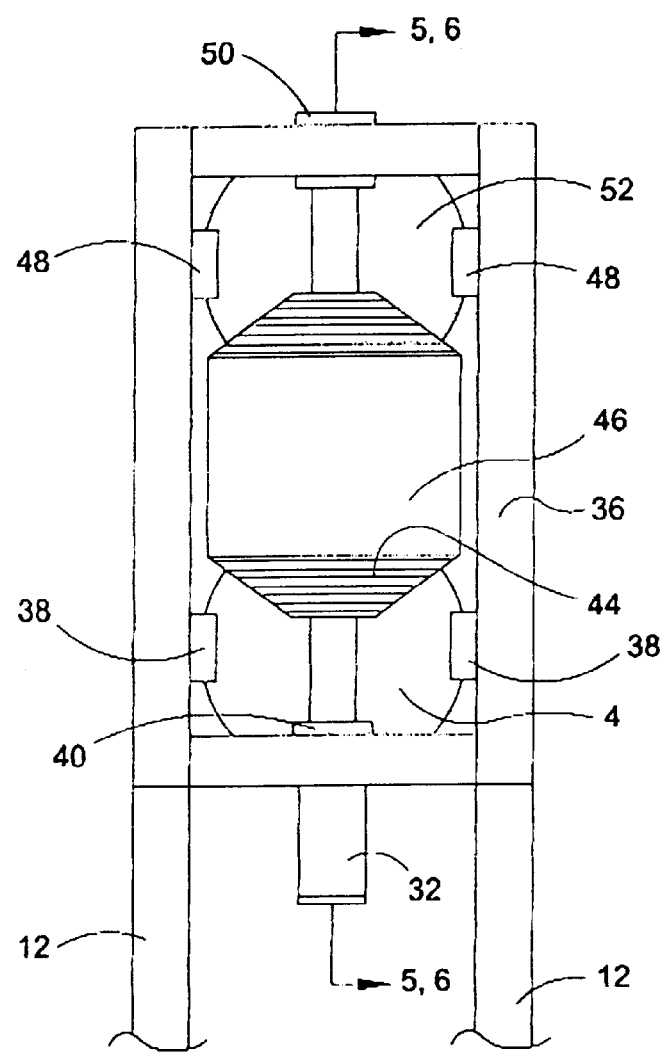
FIG. 4 is an end view of the apparatus of FIGS. 1, 2, and 3.

Referring simultaneously to FIGS. 1 and 4, a scroll supporting ladder frame 36 supports the rotatable scroll assembly, the scroll supporting ladder frame 36 having rigidly attached thereto upper and lower axle mounts 50 and 40, the axle 42 preferably being rigidly and fixedly attached to axle mounts 50 and 40. Like ladder frames 54 and 8, ladder frame 36 is representative of other suitable scroll supporting structures.

Referring to FIG. 4, the scroll supporting ladder frame 36 preferably further comprises upper hinge blocks 48 and lower hinge blocks 38, the hinge blocks 48 and 38 preferably being fixedly and rigidly attached to the ladder frame 36. Referring simultaneously to FIGS. 3 and 4, pivot pins 49 are preferably fixedly and rigidly attached to the upper cone supporting ladder frame 54, such pins 49 extending into and being received by pin receiving apertures within hinge blocks 48. Referring simultaneously to FIGS. 1, 3, and 4, the lower cone supporting ladder frame 8 is similarly pivotally mounted by pivot pines (not within view) upon hinge blocks 38. Referring further simultaneously to FIGS. 1, 3, and 4, hinge blocks 48 and 38, and their pivot pins preferably orient and align ladder frames 54 and 8 in relation to ladder frame 36 so that their two axes of pivotal motion perpendicularly intersect the longitudinal axis of the rotatable scroll.

Referring to FIG. 1, a cross bar 62 having a centrally positioned eye 64 is preferably welded to the under surface of upper ladder frame 54, and a cross bar 58 similarly having a centrally located eye 60 is preferably opposingly welded to the upper surface of the lower ladder frame 8. A spring 56 spans between eyes 64 and 60, the spring 56 biasing ladder frames 54 and 8, and their axles 56 and 2 toward each other, such biasing action simultaneously levering the conical faces of friction wheels 52 and 4 against the upper and lower conical faces of the rotatable scroll. Such levering action advantageously provides normally directed compressive forces, enhancing wheel driving friction.

Referring further to FIG. 1, a two way hydraulic cylinder 22, having hydraulic pressure lines 24 and 26 triangulates between lower ladder frame 8 and a lever arm 32 which extends downwardly from the scroll supporting ladder frame 36. The base of the hydraulic cylinder 22 is pivotally mounted upon a clevis joint 20 which extends downwardly from cross bar 18, and the distal end of the cylinder's extendable and retractable shaft 28 is similarly pivotally mounted upon clevis joint 30 which is fixedly mounted upon lever arm 32.

Figure 2:
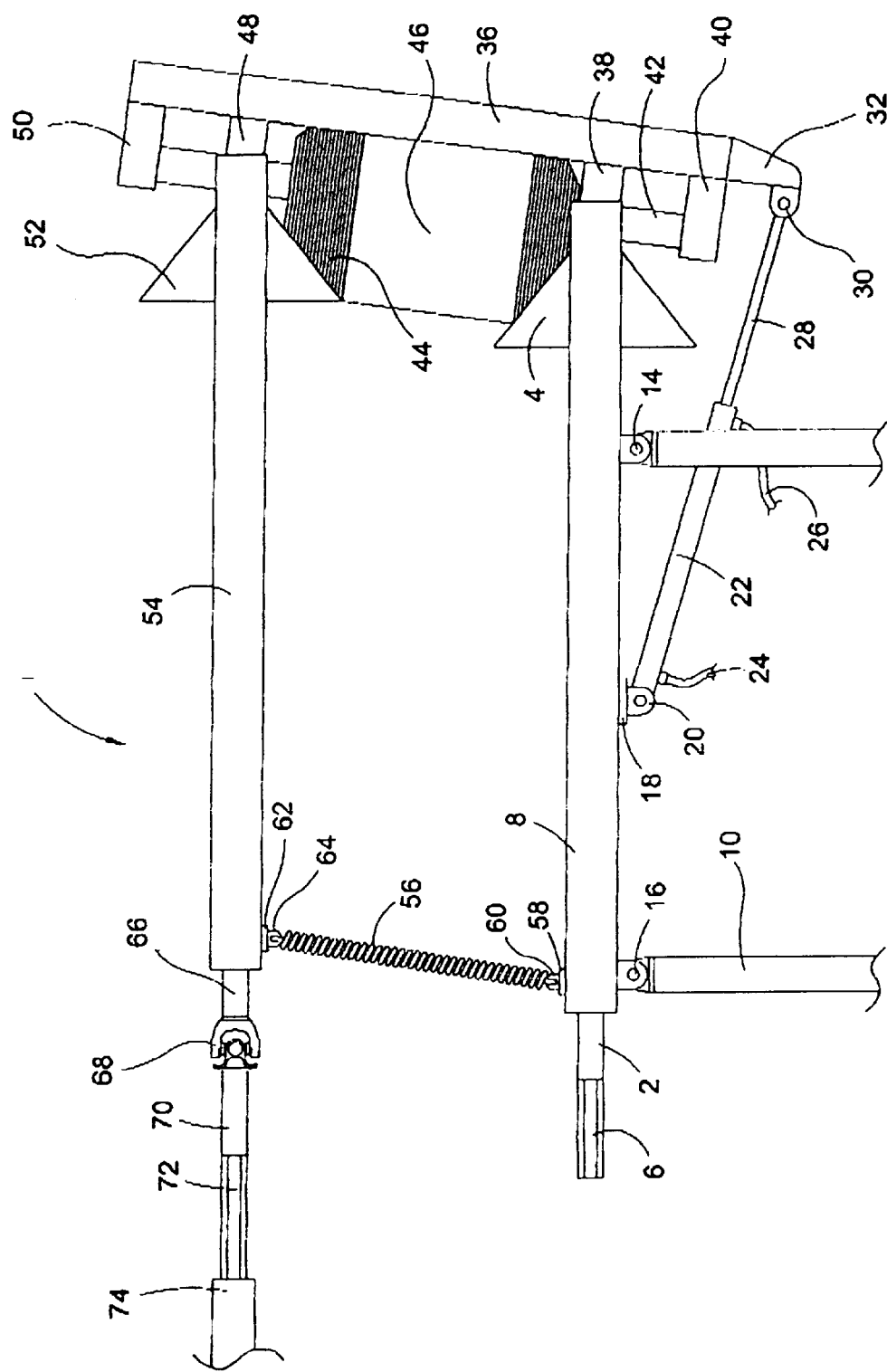
FIG. 2 redepicts FIG. 1 showing conical friction wheels rotated counter clockwise with respect to the rotatable scroll element.

Further referring to FIG. 1, in operation of the inventive continuously variable transmission 1, hydraulic fluid power may be supplied to hydraulic line 28, causing shaft 28 to retract, causing such shaft to draw lever arm 32 rearwardly to a position such as that depicted in FIG. 2. Such rearward drawing action effectively rotates conical friction wheels 52 and 4 counter clockwise in relation to the rotatable scroll. Upon such counter clockwise rotation, the rotatable scroll slides slightly downwardly along axle 42, and the spirally wound component 44 of the scroll skews downwardly, increasing the pitch of the scroll's upper conical face, and simultaneously decreasing the pitch of the scroll's lower conical face. Opposite operation of the hydraulic cylinder 22 to extend shaft 28 may return the transmission to the configuration depicted in FIG. 1, upwardly sliding and skewing the rotatable scroll.

Through selective operation of hydraulic cylinder 22, the transmission 1 may be selectively held in any angular configuration between those depicted in FIGS. 1 and 2. The triangulating hydraulic cylinder assembly 22 depicted in FIGS. 1 and 2 is representative of numerous suitably substituted rectilinear motion actuators such as pneumatic cylinders or jack screws. In general, the triangulating relationship between cylinder 22, ladder frame 8, and lever arm 32 is representative of numerous known means for selectively adjusting the relative angular orientations of the scroll and the conical friction wheels 52 and 4.

Referring further to FIG. 1, a representational support structure for the transmission 1 comprises clevis joints 16 and 4 mounted upon upper ends of support posts 10 and 12. Such transmission support assembly is representative of numerous other means for mounting, supporting, and carrying the inventive transmission. A traditional "gear box" housing (not depicted) may suitably provide structural support for the inventive transmission.

Referring simultaneously to FIGS. 1 and 2, axle 2 has a rear prismatic end 6 serving as a drive linkage for rotary power input (or output). The upper shaft 66 includes a rear section 70 linked by a universal joint 68. Shaft 70 has a prismatic rearward end 72, such end being slidably received by a prismatic hollow bore of power output shaft 74.

Referring simultaneously to FIGS. 1 and 5, it can be seen that a single rotation of lower conical friction wheel 4 circumferentially moves point 102 about the scroll a distance approximately equal to the circumference of the base of wheel 4. Point 100 correspondingly moves circumferentially an equal distance. Since point 100 is positioned along the conical face of friction wheel 52 forward from such wheel's base, frictional contact at point 100 tends to rotate wheel 52 at a rate greater than the rotational rate of wheel 4. Paired contact points similar to those at point 100 and 102 exist for each wrapped or wound layer of sheet 44, each paired contact point having a mechanical advantage ratio identical to that of contact points 100 and 102. As a result of such continuity of the mechanical advantage ratio between contact points, static friction is advantageously established at all points of frictional contact, eliminating undesirable sliding friction.

Figure 6:
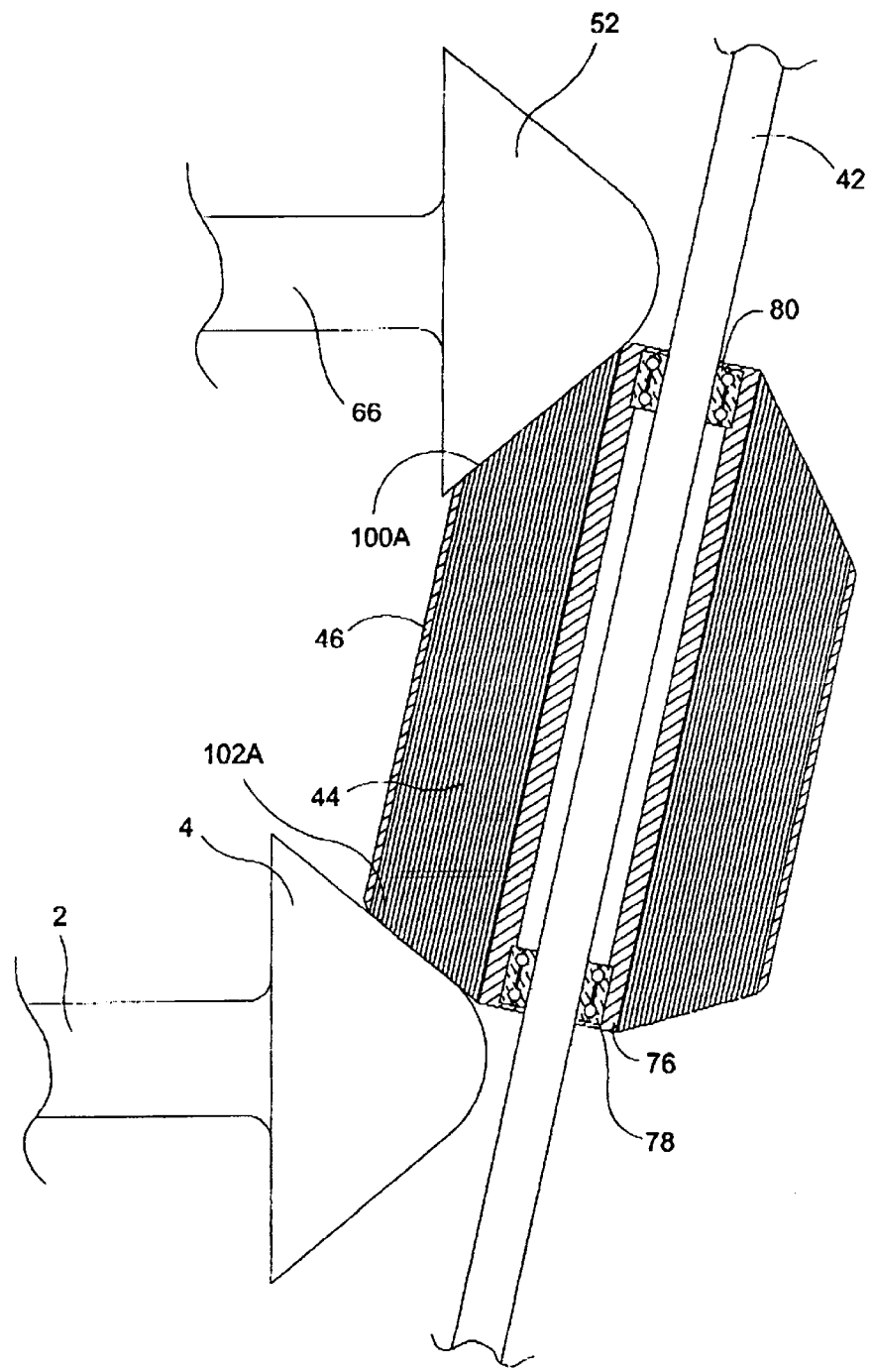
FIG. 6 is a sectional view as indicated in FIG. 4, the view being representative of the configuration of FIG. 2.

Referring simultaneously to FIGS. 1, 2, 5, and 6, upon counter clockwise rotation of wheels 52 and 4, and upon downward skewing of the scroll to the position depicted in FIG. 6, an opposite mechanical advantage is attained, causing wheel 52 to rotate at a rate slower than wheel 4. In FIG. 6, the mechanical ratio between points 102A and 100A is the reverse of that of points 102 and 100 in FIG. 5. In the downwardly skewed scroll position depicted in FIG. 6, continuity of the mechanical advantage ratio between paired contact points continues to exist, promoting desirable static friction notwithstanding the variance in power transmission ratios.

Referring simultaneously to all figures, shaft 66 may suitably alternately serve as a power input shaft. Also, axle 42 may suitably alternately serve as a power input or power output shaft, provided that axle 42 is mounted for rotary motion, and provided that the spindle 76 is rotationally linked with axle 42. Where axle 42 functions as a power input or output shaft, either of the wheels 52 and 4 may serve as scroll guiding idler wheel.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A continuously variable transmission comprising:
   (a) a rotatable scroll having an axis of rotation and having upper and lower faces, the upper and lower faces each being conical and each having a pitch, the rotatable scroll being alternately upwardly and downwardly skewable along its axis of rotation, the pitches of the upper and lower faces respectively decreasing and increasing upon upward skewing of the rotatable scroll, the pitches of the upper and lower faces respectively increasing and decreasing upon downward skewing of the rotatable scroll;
   (b) upper and lower rotatable wheels, each having an axis of rotation and each having a forward face, each forward face being conical; and,
   (c) wheel mounting means continuously positioning the upper rotatable wheel, the lower rotatable wheel, and the rotatable scroll for frictional contacts between the the forward faces of the upper and lower wheels and the upper and lower faces of the rotatable scroll.

2. The continuously variable transmission of claim 1 wherein the upper and lower wheels comprise rearwardly extending drive axles.

3. The continuously variable transmission of claim 2 wherein the rotatable scroll comprises a scroll axle.

4. The continuously variable transmission of claim 3 wherein the wheel mounting means comprises a support frame facilitating rotating motions of the upper and lower wheels about their axes of rotation, and facilitating alternate clockwise and counter clockwise pivoting motions of the upper and lower wheels with respect to the rotatable scroll.

5. The continuously variable transmission of claim 4 further comprising means for applying normal compressive forces at the rotatable wheels' and rotatable scroll's frictional contacts.

6. The continuously variable transmission of claim 5 further comprising angular positioning means operatively connected to the support frame, said means being capable of selectively angularly positioning the rotatable scroll with respect to the upper and lower rotatable wheels.

7. The continuously variable transmission of claim 6 further comprising upper and lower drive linkages fixedly attached to or formed wholly with rearward ends of the upper and lower rotatable wheels' drive axles.

8. The continuously variable transmission of claim 7 wherein the normal compressive force applying means comprises a spring.

9. The continuously variable transmission of claim 8 wherein the angular positioning means comprises a rectilinear motion actuator.

10. The continuously variable transmission of claim 1 wherein the rotatable scroll comprises a trapezoidally shaped and spirally wound sheet, or comprises a multiplicity of nesting tubes.

11. The continuously variable transmission of claim 10 wherein the rotatable scroll further comprises a spindle annularly underlying the trapezoidally shaped and spirally wound sheet or annularly underlying the nesting tubes.

12. The continuously variable transmission of claim 11 wherein the upper and lower wheels comprise rearwardly extending drive axles.

13. The continuously variable transmission of claim 12 wherein the rotatable scroll comprises a scroll axle.

14. The continuously variable transmission of claim 13 wherein the wheel mounting means comprises a support frame facilitating rotating motions of the upper and lower wheels about their axes of rotation, and facilitating alternate clockwise and counter clockwise pivoting motions of the upper and lower wheels with respect to the rotatable scroll.

15. The continuously variable transmission of claim 14 further comprising means for applying normal compressive forces at the rotatable wheels' and rotatable scroll's frictional contacts.

16. The continuously variable transmission of claim 15 further comprising angular positioning means operatively connected to the support frame, said means being capable of selectively angularly positioning the rotatable scroll with respect to the upper and lower rotatable wheels.

17. The continuously variable transmission of claim 16 further comprising upper and lower drive linkages fixedly attached to or formed wholly with rearward ends of the upper and lower rotatable wheels' drive axles.

18. The continuously variable transmission of claim 17 wherein the normal compressive force applying means comprises a spring.

19. The continuously variable transmission of claim 18 wherein the angular positioning means comprises a rectilinear motion actuator.

* * * * *